United States Patent
Von Breitenbach et al.

(10) Patent No.: US 8,083,258 B2
(45) Date of Patent: Dec. 27, 2011

(54) GAS GENERATOR ASSEMBLY FOR A MOTOR VEHICLE

(75) Inventors: Gerrit Von Breitenbach, Karlstein (DE); Björn Windhausen, Schömberg (DE)

(73) Assignee: Takata-Petri AG, Aschaffenburg (DE)

( * ) Notice: Subject to any disclaimer, the term of this patent is extended or adjusted under 35 U.S.C. 154(b) by 0 days.

(21) Appl. No.: 13/025,992

(22) Filed: Feb. 11, 2011

(65) Prior Publication Data

US 2011/0133436 A1    Jun. 9, 2011

Related U.S. Application Data

(63) Continuation of application No. PCT/EP2009/062831, filed on Oct. 2, 2009.

(30) Foreign Application Priority Data

Oct. 17, 2008   (DE) .......................... 10 2008 052 481

(51) Int. Cl.
*B60R 21/26* (2011.01)

(52) U.S. Cl. ........................ 280/736; 280/741

(58) Field of Classification Search ................. 280/741, 280/736
See application file for complete search history.

(56) References Cited

U.S. PATENT DOCUMENTS

| 5,756,928 | A | * | 5/1998 | Ito et al. ............................. 149/7 |
| 6,095,559 | A | * | 8/2000 | Smith et al. .................... 280/741 |
| 6,196,583 | B1 | | 3/2001 | Ruckdeschel et al. |
| 6,279,948 | B1 | | 8/2001 | Rank |
| 6,336,660 | B1 | * | 1/2002 | Katsuda et al. ................. 280/741 |
| 6,412,814 | B1 | | 7/2002 | Huber et al. |
| 7,686,329 | B2 | * | 3/2010 | Meissner et al. ............... 280/739 |
| 7,690,680 | B2 | * | 4/2010 | Meissner et al. ............... 280/736 |
| 7,946,617 | B2 | * | 5/2011 | Meissner et al. ............... 280/736 |
| 2006/0267322 | A1 | * | 11/2006 | Eckelberg ...................... 280/736 |
| 2010/0201110 | A1 | | 8/2010 | Meissner et al. |
| 2011/0025031 | A1 | * | 2/2011 | Windhausen et al. ......... 280/741 |
| 2011/0079993 | A1 | * | 4/2011 | Schreiber et al. .............. 280/741 |

FOREIGN PATENT DOCUMENTS

| DE | 196 02 695 A1 | 7/1997 |
| DE | 197 26 296 A1 | 12/1998 |
| DE | 199 13 145 A1 | 2/2000 |
| DE | 10 2006 010 953 A1 | 9/2007 |
| EP | 0 995 643 A2 | 4/2000 |
| JP | 4006192 | 1/1992 |
| JP | 11-059319 | 3/1999 |
| WO | WO-2007/141335 A1 | 12/2007 |

OTHER PUBLICATIONS

International Search Report in PCT/EP2009/062831 dated Dec. 16, 2009.
International Preliminary Report on Patentability (IPRP) in PCT/EP2009/062831 dated Apr. 19, 2011.

\* cited by examiner

*Primary Examiner* — Drew Brown
(74) *Attorney, Agent, or Firm* — Foley & Lardner, LLP

(57) ABSTRACT

A gas generator assembly for a motor vehicle is provided. The gas generator assembly having a gas generator which is designed to provide gas to inflate in airbag after the gas generator is activated, a filter for filtering gases provided by the gas generator and a device which is designed to release a fluid so that said fluid comes into contact with the filter. The device is designed to release the fluid at a point in time which can be pre-defined and which is independent of the point in time of the activation of the gas generator.

19 Claims, 1 Drawing Sheet

GAS GENERATOR ASSEMBLY FOR A MOTOR VEHICLE

CROSS-REFERENCE TO RELATED PATENT APPLICATIONS

This application is a continuation of International Patent Application Number PCT/EP2009/062831, filed on Oct. 2, 2009, which was published in German as WO 2010/043507. The foregoing international application is incorporated by reference herein.

BACKGROUND OF THE INVENTION

The invention relates to a gas generator assembly for a motor vehicle.

Such gas generator assembly comprises a gas generator which is designed and intended for providing gas for inflating an airbag of a motor vehicle after activating the gas generator, whereby such an assembly comprises furthermore a filter for filtering the gases provided by the gas generator, and a separate device which is designed and intended to release a fluid so that said fluid is injected into the filter.

An object of the invention is to provide for a gas generator assembly having an inflation behaviour which may be influenced in a variable manner.

SUMMARY

According to an exemplary embodiment of the invention a gas generator assembly comprises a device that is designed and configured to release a fluid at a pre-defined point of time, which is independent from the point of time of activation of the gas generator.

Accordingly, an injection of the fluid into a filter of the gas generator assembly can occur at any point of time. In particular, the inflation behaviour of the gas generator can be managed in a directed manner via the point of time of the injection of the fluid into the filter. If the release of the fluid occurs during or after providing or (pyrotechnically) producing of a gas amount required for inflating an airbag, the energy stored in the filter—the filter warms up due to the hot gases of the gas generator streaming through the filter—can be used for the production of an additional gas volume; the fluid injected into the filter evaporates due to the heat energy stored in the filter and provides an additional gas volume.

Furthermore, the injection of the fluid into the filter during the activation of the gas generator can also occur for active cooling of the filter and simultaneously for cooling of the gases provided by the gas generator.

Furthermore, there is the possibility to wet the filter in a maximum manner by means of the fluid by releasing the fluid through the said device such that said fluid comes into contact with the filter before the activation of the gas generator.

Furthermore, the wetting of the filter with the fluid allows a binding of dust and particles and provides also an additional cooling of the gas generator housing.

Due to the solution according to the invention, smaller filters can be used as well as the required amount of gas set (amount of fuel), which exemplary produces the gas provided by the gas generator by burning thereof, can be reduced by using the heat stored in the filter after providing the gas for producing an additional gas volume. This provides an additional variability of the gas generator capacity in comparison to common gas generators. Furthermore, the gas generator is cooled by injecting the fluid into the filter so that the use of low priced plastic parts is also possible.

Said device comprises exemplary a device for generating a movement, which is designed and provided for interacting with the fluid stored in the device for releasing said fluid at a predefined point of time so that said fluid comes into contact with the filter or is injected into the filter.

The device for generating a movement is thereby exemplary designed for charging said fluid with a pressure for releasing the fluid.

The device comprises a chamber for storing said fluid at which the device for generating a movement is exemplary arranged. Therefore, the device for generating a movement, which in particular provides pyrotechnically (gas generator) the pressure for charging the fluid stored in the chamber, can charge the fluid stored in the chamber for releasing the fluid with said pressure. This can occur via an element in form of a plunger, a flexible membrane or any other sealing element for sealing the chamber against the device for generating a movement, which is arranged between the device for generating a movement and the fluid arranged in the chamber. Due to the pressure provided by means of the device for generating a movement said element is pressed out of a starting position into an end position, whereby said element picks up the fluid and presses it out of the chamber. The said element can also be destroyed by the pressure or can be burned by the device for generating a movement, so that the pressure charges the fluid directly.

The gas generator comprises exemplary a housing which at least comprises the filter and a gas producing substance (fuel) which can be ignited by means of an ignition of an igniter for producing gases to be provided by the gas generator. The housing of the gas generator defines an interior space of the gas generator or the housing in which the said components are arranged.

The chamber for storing the fluid to be injected into the filter is exemplary arranged outside of the interior space of the housing of the gas generator. Thereby the chamber of the device is exemplary connected via a connection line with the interior space of the housing, so that the fluid stored in the chamber can get out of the chamber via said connection line into the interior space of the housing of the gas generator. Said connection line comprises for wetting the filter at least one opening arranged in the interior space of the housing through which the fluid stored in the chamber can leave the connection line so that the fluid comes into contact with the filter. Alternatively, the chamber as well as the complete device for injecting the fluid can also be arranged in the said housing of the gas generator, e.g. in the interior space of the housing. The housing of the gas generator comprises at least one outflow opening for emitting the gases pyrotechnically produced by the gas generator, whereby through said outflow opening the gases provided in the interior space of the housing of the gas generator (for instance by burning a gas producing substance) can escape from the interior space into an outside space surrounding the gas generator.

Said gas generator is thereby exemplary arranged in an interior space of the airbag defined by the airbag for inflating an airbag of the motor vehicle airbag module or flow connections are provided, which connect at least one outflow opening of the gas generator with an inflow opening of the airbag or the interior space of the airbag.

The gas provided by the gas generator in the interior space of the housing of the gas generator flows exemplary along a gas flow direction pointing to at least one outflow opening via a flow connection arranged in the interior space of the housing to at least one outflow opening of the housing, whereby exemplary the filter arranged in the interior space of the housing is arranged in the gas flow direction in front of the at least one outflow opening.

Therefore, the gas generated by the gas generator has at first to past the filter before it can be emitted from the at least one outflow opening of the gas generator.

The opening of the connection line of the device for injecting the fluid along said gas flow direction is exemplary arranged in front of the filter, e.g. the filter is arranged along the flow connection between the at least one outflow opening and the opening of the connection line (the connection line can comprise of course also a number of openings).

There is also the possibility to provide said opening of the connecting line in the filter itself so that the filter surrounds the opening of the connection line or is arranged around said opening. In this manner the fluid can be directly injected into the filter.

Furthermore, in an alternative exemplary variant the opening is arranged along the gas flow direction on an end of the filter which can be opposite to the outflow opening along the gas flow direction. Or said differently, the opening is arranged along the gas flow direction between the filter and the outflow opening. Hereby, the opening is exemplary arranged opposite to the gas flow direction, e.g. the opening faces the gas flow. In this manner a counter-flow arrangement of the opening of the connection line is provided (so that gas can in principle enter the connection line through the opening, but is prevented by doing so due to the pressure of the outflowing fluid). Furthermore, an openable (destroyable) membrane is provided in the area of the connection line, which prevents an uncontrolled emision of the fluid out of the connection line and/or an uncontrolled intrusion of gas into the connection line or the chamber.

Said device for releasing the fluid comprises, exemplary for controlling the device for generating a movement, which serves the release of the fluid at any point of time, a control electronics, which controls said device for generating a movement.

Thereby, said control electronics is exemplary designed and provided to trigger the device for generating a movement for providing the pressure with which the fluid for releasing is being charged dependent on at least one parameter, which can be detected by a sensor arranged in or at the motor vehicle. Such a parameter can be in particular the weight of the passenger, a body size of the passenger, a position of the passenger in the interior space of the motor vehicle in respect to the inflatable airbag or another parameter related to the motor vehicle.

The control electrics is exemplary intended and provided to trigger the device for generating a movement while the gas generator provides gas for inflating an airbag or after the gas generator has provided gas for inflating the airbag. This means that the device for generating a movement is being triggered while the fuel of the gas generator is converted (burned) to gas or after the fuel of the gas generator was completely converted (burned).

Furthermore, the control electronics if exemplary designed and provided to trigger the device for generating a movement before the gas generator provides gas for inflating an airbag, e.g. before the fuel of the gas generator is ignited.

BRIEF DESCRIPTION OF THE DRAWINGS

The described features and advantages of the invention become more apparent by the means of the following description of the Figures of an embodiment.

DETAILED DESCRIPTION

Figure 1:
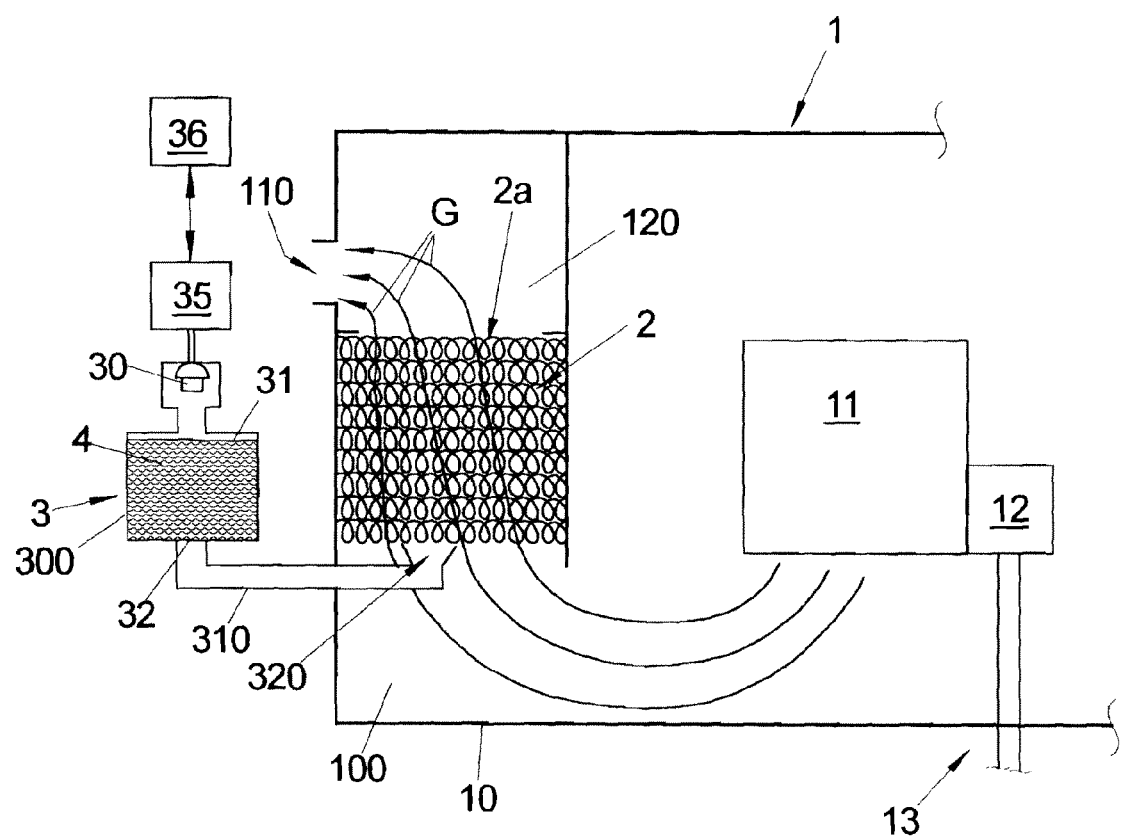
FIG. 1 shows a schematic sectional view of a gas generator assembly according to the invention.

FIG. 1 shows by the means of a schematic, cutout-like sectional view a gas generator assembly according to the invention with a gas generator 1 comprising a housing 10, which defines an interior space 100 of the gas generator 1.

In said interior space 100 a fuel 11 (gas set) is arranged which can be ignited by the means of an igniter 12, which is also arranged in said interior space 100 and contains optionally a booster charge. If said fuel 11 is ignited by the igniter 12 a gas is produced by burning the fuel 11 which can be used for inflating an airbag of a motor vehicle airbag module. An electrical connection line 13 is provided for activating the igniter 12, whereby said connection line can be connected with an electronic on the vehicle side for triggering the igniter 12. A flow connection 120 along which the gas provided by the gas generator 1 in the interior space 100 can flow to an outflow opening 110 provided at the housing 10 of the gas generator 1, extends from the fuel 11 along a gas flow direction G.

Along said flow connection 120 a filter 2 is arranged between the fuel 11 and the outflow opening 110, which serves for filtering the gas provided by the gas generator 1. Thereby, the filter 2 can hold back particles obtained by the pyrotechnical conversion of the fuel 11 into gas and can furthermore cool the gas provided by the gas generator 1. The filter 2 consists exemplary of a metal.

The filter 2 is thus arranged along the flow connection 120 so that the gas provided by the gas generator (burning the fuel 11) can exemplary get only via the said filter 2 to the outflow opening 110.

Since the hot gas passing the filter 2 along the gas flow direction G heats the filter 2, the heat stored in filter 2 can be used for producing a further gas volume by wetting the filter 2 by the means of a fluid 4—by evaporating of said fluid 4. There is furthermore the possibility to cool said filter 2 as well as gases flowing through the filter 2 by injecting a fluid 4 into filter 2.

For this reason, the gas generator 1 comprises a separate device 3 which is according to FIG. 1 preferably arranged outside of the interior space 100 of the housing 10 of the gas generator 1. Said device 3 can also be integrated into the housing 10 of the gas generator 1. The device 3 comprises a chamber 300 for storing said fluid 4, whereby a device for generating a movement 30 in form of a gas generator is provided for releasing said fluid 4 into the filter 2, which is arranged on said chamber 300. The device for generating a movement 30 is thereby designed to charge the fluid 4 arranged in the chamber 300 with a pressure via a membrane 31 or a plunger 31 or another element 31 so that the fluid 4 can get via a connection line 310, which connects the chamber 300 and the interior space 100 of the housing 10 in a fluid manner, into the interior space 100 of the housing 10. In order that the fluid 4 after a charging with a pressure provided by the device for generating a movement 30 can wet the filter 2 rather fast, the connection line 310 comprises an opening 320 which is arranged along the gas stream direction G in front of the filter 2. This means that the filter 2 is arranged along the gas flow direction G between said opening 320 of the connection line 310 and the outflow opening 110 of the housing 10. A membrane 32 prevents the unintended flow of the fluid 4 into the interior space 100 through the opening 320.

The device for generating a movement 30 is connected to control electronics 35 via which the device for generating a movement 30 can be controlled. In order to trigger the device for generating a movement 30 such that the device for generating a movement 30 provides the pressure required for releasing the fluid 4, the control electronics 35 produces a corresponding triggering signal, which is provided by the control electronics 35 in dependency on at least one parameter detectable by a sensor 36. Such a sensor 36 is accordingly coupled to the control electronics 35. The device for generating a movement 30 can be in particular controlled by the control electronics 35 such that the fluid 4 can be released at any point of time, in particular independent on the activation of the igniter 12 of the generator 1, into the interior space 100, and namely into the filter 2.

The solution according to the invention is therefore in particular characterized by the actively controllable point of time of injection of the fluid into the filter 2. Hereby, the fluid 4 stored in the chamber 300 is preferably unloaded directly into the filter 2 by a common igniter (device for generating a movement 30).

This priority application, German Patent Application Number 10 2008 052 481.6, filed on Oct. 17, 2008 is incorporated by reference herein.

What is claimed is:

1. A gas generator assembly for a motor vehicle comprising:
    a gas generator which is configured to provide gas to inflate an airbag after the gas generator has been activated,
    a filter for filtering gases provided by the gas generator; and
    a device which is designed to release a fluid so that said fluid comes into contact with the filter,
    wherein said device is configured to release said fluid at a point in time which can be pre-defined and which is independent from the point of time of the activation of the gas generator.

2. The gas generator assembly according to claim 1, wherein the device comprises a device for generating a movement which is designed to interact with the fluid for releasing the fluid at the point of time which can be pre-defined.

3. The gas generator assembly according to claim 2, wherein the device for generating a movement is designed for charging the fluid with a pressure for releasing the fluid.

4. The gas generator assembly according to claim 3, wherein the device for generating a movement is designed for providing said pressure pyrotechnically.

5. The gas generator assembly according to claim 1, wherein the device comprises a chamber for storing the fluid.

6. The gas generator assembly according to claim 1, further comprising a housing of the gas generator for receiving at least the filter and a substance for generating a gas for pyrotechnically producing the gas provided by the gas generator, whereby the housing defines an interior space.

7. The gas generator assembly according to the claims 6, wherein a chamber is arranged outside of the interior space of the housing.

8. The gas generator assembly according to claim 7, wherein the chamber of the device is connected via a connection line with the interior space of the housing so that the fluid can get from the chamber via the connection line into the interior space.

9. The gas generator assembly according to claim 8, wherein the connection line comprises an opening arranged in the interior space of the housing through which the fluid can leave the connection line.

10. The gas generator assembly according to claim 9, wherein the opening is arranged along the gas flow direction in front of the filter.

11. The gas generator assembly according to claim 9, wherein the opening is arranged along the gas flow direction in the filter.

12. The gas generator assembly according to claim 9, wherein the opening (320) is arranged along the gas flow direction (G) on one end (2a) of the filter (2).

13. The gas generator assembly according to claim 6, wherein the housing comprises at least one outflow opening for emitting gases provided by the gas generator.

14. The gas generator assembly according to claim 6, wherein the gas provided by the gas generator in the interior space of the housing is guided along a gas flow direction pointing to at least one outflow opening of the housing.

15. The gas generator assembly according to the claim 14 wherein the filter is arranged in front of the at least one outflow opening in respect to the gas flow direction.

16. The gas generator assembly according to claim 1, wherein a control electronics is provided for controlling the device for generating a movement.

17. The gas generator assembly according to claim 16, wherein the control electronics is designed for triggering the device for generating a movement for providing the pressure in dependency on at least one parameter detectable by at least one sensor.

18. The gas generator assembly according to claim 16, wherein the control electronics is designed for triggering the device for generating a movement, while the gas generator provides gas for inflating an airbag or after the gas generator has provided gas for inflating the airbag.

19. The gas generator assembly according to claim 16, wherein the control electronics are designed for triggering the device for generating a movement before the gas generator provides gas for inflating an airbag.

* * * * *